(12) United States Patent
Brodersen et al.

(10) Patent No.: US 7,831,727 B2
(45) Date of Patent: Nov. 9, 2010

(54) MULTI-CONTENT PRESENTATION OF UNASSOCIATED CONTENT TYPES

(75) Inventors: Rainer Brodersen, San Jose, CA (US); Rachel Clare Goldeen, Mountain View, CA (US); Jeffrey Ma, Redwood City, CA (US); Mihnea Calin Pacurariu, Los Gatos, CA (US); Eric Taylor Seymour, San Jose, CA (US); Thomas Michael Madden, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 729 days.

(21) Appl. No.: 11/530,822

(22) Filed: Sep. 11, 2006

(65) Prior Publication Data

US 2008/0065720 A1  Mar. 13, 2008

(51) Int. Cl.
 *G06F 15/16* (2006.01)
(52) U.S. Cl. ......................... 709/231; 706/14.4; 725/32
(58) Field of Classification Search ................. 709/204, 709/217, 232, 231; 715/704, 716, 717; 704/208; 705/14.4; 725/32
See application file for complete search history.

(56) References Cited

U.S. PATENT DOCUMENTS

| 5,448,315 | A | * | 9/1995 | Soohoo ........................ 348/722 |
| 5,619,249 | A | | 4/1997 | Billock et al. |
| 5,717,879 | A | * | 2/1998 | Moran et al. ................. 715/716 |
| 5,822,123 | A | | 10/1998 | Davis et al. |
| 5,822,537 | A | * | 10/1998 | Katseff et al. ............... 709/231 |
| 5,880,768 | A | | 3/1999 | Lemmons et al. |
| 6,006,227 | A | | 12/1999 | Freeman et al. |
| 6,335,737 | B1 | | 1/2002 | Grossman et al. |
| 6,448,987 | B1 | | 9/2002 | Easty et al. |
| 6,587,127 | B1 | * | 7/2003 | Leeke et al. ................. 715/765 |
| 6,638,313 | B1 | | 10/2003 | Freeman et al. |
| 6,725,427 | B2 | | 4/2004 | Freeman et al. |
| 6,768,999 | B2 | | 7/2004 | Prager et al. |
| 6,904,566 | B2 | * | 6/2005 | Feller et al. ................. 715/728 |
| 6,944,632 | B2 | * | 9/2005 | Stern ........................ 707/104.1 |
| 7,072,908 | B2 | * | 7/2006 | Dideriksen et al. ................. 1/1 |
| 7,292,243 | B1 | | 11/2007 | Burke |
| 7,362,331 | B2 | | 4/2008 | Ording |
| 7,363,591 | B2 | | 4/2008 | Goldthwaite et al. |
| 7,376,414 | B2 | * | 5/2008 | Engstrom ................. 455/414.3 |
| 2002/0033848 | A1 | | 3/2002 | Sciammarella et al. |

(Continued)

FOREIGN PATENT DOCUMENTS

EP     1 469 375 A1    10/2004

(Continued)

OTHER PUBLICATIONS

U.S. Appl. No. 11/530,824, filed Sep. 11, 2006, Madden et al.

(Continued)

*Primary Examiner*—Saleh Najjar
*Assistant Examiner*—Marie Georges Henry
(74) *Attorney, Agent, or Firm*—Fish & Richardson P.C.

(57) ABSTRACT

Audio files and video files are selected for playback. One or more unassociated video items are selected for presentation during a playback of a selected audio file and presented during the playback of the selected audio file.

24 Claims, 5 Drawing Sheets

U.S. PATENT DOCUMENTS

| | | | |
|---|---|---|---|
| 2002/0083469 A1 | 6/2002 | Jeannine et al. | |
| 2002/0175931 A1* | 11/2002 | Holtz et al. | 345/716 |
| 2003/0110450 A1 | 6/2003 | Sakai | |
| 2003/0117425 A1 | 6/2003 | O'Leary et al. | |
| 2003/0142751 A1 | 7/2003 | Hannuksela | |
| 2003/0174160 A1* | 9/2003 | Deutscher et al. | 345/716 |
| 2004/0008211 A1* | 1/2004 | Soden et al. | 345/623 |
| 2004/0100479 A1 | 5/2004 | Nakano et al. | |
| 2004/0140995 A1 | 7/2004 | Goldthwaite et al. | |
| 2004/0150657 A1 | 8/2004 | Wittenburg et al. | |
| 2004/0261031 A1 | 12/2004 | Tuomainen et al. | |
| 2005/0041033 A1 | 2/2005 | Hilts | |
| 2005/0044499 A1* | 2/2005 | Allen et al. | 715/704 |
| 2005/0091597 A1* | 4/2005 | Ackley | 715/716 |
| 2005/0160375 A1 | 7/2005 | Sciammarella et al. | |
| 2005/0246654 A1 | 11/2005 | Hally et al. | |
| 2005/0278656 A1 | 12/2005 | Goldthwaite et al. | |
| 2006/0020962 A1 | 1/2006 | Stark et al. | |
| 2006/0031776 A1 | 2/2006 | Glein et al. | |
| 2006/0265409 A1 | 11/2006 | Neumann et al. | |
| 2007/0088781 A1* | 4/2007 | Ludwig et al. | 709/204 |
| 2007/0162853 A1 | 7/2007 | Weber et al. | |
| 2007/0180138 A1* | 8/2007 | Ogram | 709/231 |
| 2007/0288863 A1 | 12/2007 | Ording et al. | |
| 2008/0062894 A1 | 3/2008 | Ma et al. | |
| 2008/0065638 A1 | 3/2008 | Brodersen et al. | |
| 2008/0066010 A1 | 3/2008 | Brodersen et al. | |
| 2008/0066013 A1 | 3/2008 | Brodersen et al. | |
| 2008/0066110 A1 | 3/2008 | Brodersen et al. | |
| 2008/0092168 A1 | 4/2008 | Logan et al. | |
| 2008/0122870 A1 | 5/2008 | Brodersen et al. | |

FOREIGN PATENT DOCUMENTS

EP    1 510 911 A2    3/2005

OTHER PUBLICATIONS

"Fading Image Rollovers," http://web.archive.org/web/20060111080357/http://www.javascript-fx.com/fade_rollovers/general_help/help.html. Jan. 11, 2006, 1 page.

"Animated Image Blur," http://web.archive.org/web/20060430062528/http://www.tutorio.com/tutorial/animated-image-blur, Apr. 30, 2006, 2 pages.

* cited by examiner

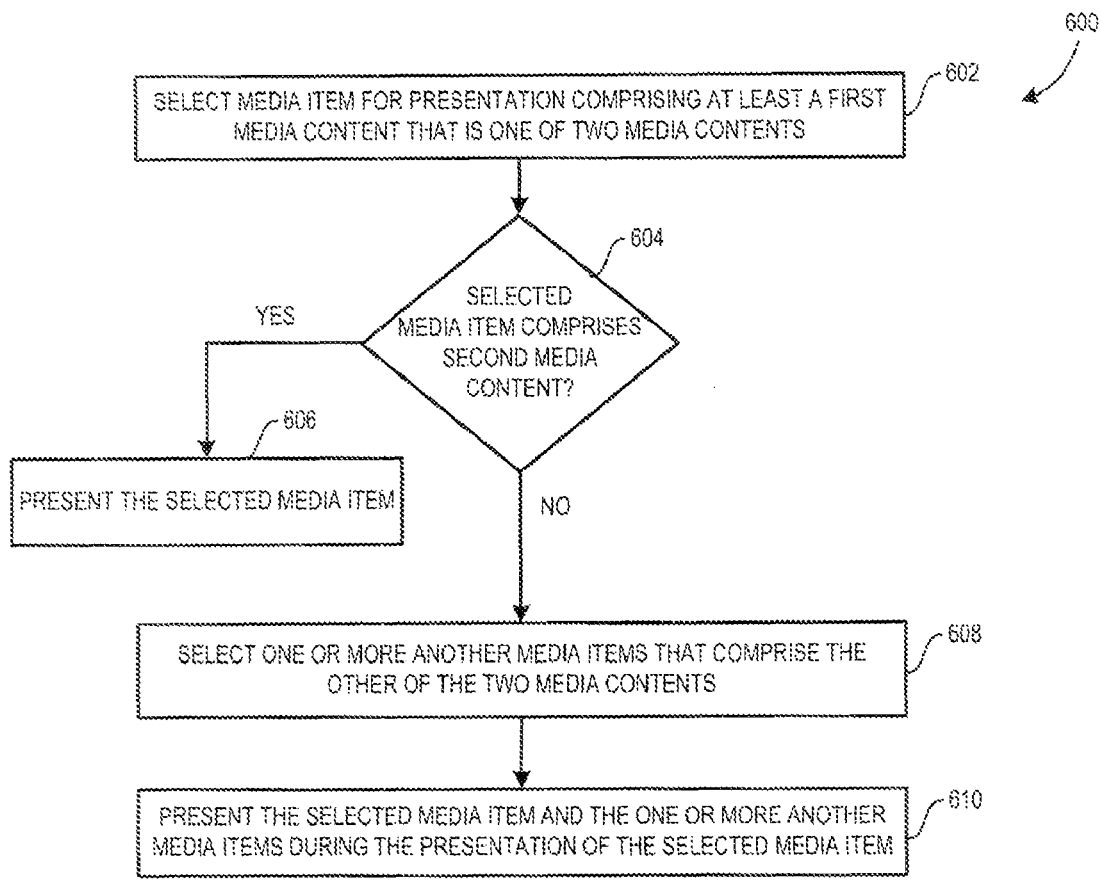

MULTI-CONTENT PRESENTATION OF UNASSOCIATED CONTENT TYPES

BACKGROUND

This disclosure is related to media processing systems and methods.

Media devices, such as digital video and audio players, can include multiple functions and capabilities, such as playing stored content, browsing and selecting from recorded content, storing and/or receiving content selected by a user, and the like. These various functions can often be grouped according to content types, e.g., movies, music, television programs, photos, etc. The functions can then be accessed through various user interfaces that are typically arranged in a hierarchal manner, having a "root" or "home" user interface at the top of the hierarchy, from which the various context-dependent user interfaces accessible.

Often users must navigate through the hierarchical menu to select different content types, e.g., a user may navigate to a music content user interface to select a playlist or a shuffle function to play back songs, and then navigate to a second content user interface to select photos or other media content to be displayed when the songs are played back. Additionally, users may desire to display content of a second type that is unassociated with content of a first type. For example, a user may select a playlist of songs, and some of the songs may include associated video data, e.g., a music video. The user may desire that unassociated video be displayed when a song that does not have associated video data is being displayed, such as personal photos.

SUMMARY

Disclosed herein are systems and methods for multi-content presentations. In one implementation, media files are selected for playback. For each media file selected, one or more unassociated video items are selected for presentation during a playback of the selected media file if the selected media file is an audio file. The selected media file is presented, and the selected one or more video items are presented during the presentation of the selected media file.

In another implementation, audio and video files are stored. The audio files and the video files are selected for playback. For each selected audio file, one or more unassociated video items are selected for presentation during a playback of the selected audio file. The selected audio file or video file is played back, and the selected one or more video items are presented during the playback of the selected audio file.

In another implementation, a media item is selected for presentation. The media item comprises at least a first media content type that is one of two media content types. If the selected media item does not comprise a second media content type that is the other of the two media content types, then one or more another media items that comprise the other of the two media content types are selected. The selected media item is presented, and the selected one or more another media items are likewise presented during the presentation of the selected media item. The first and second media content type may comprise, for example, audio and video content type, and the media items may comprise, for example, audio and/or video files, audio and/or video streams, photos, images, and the like.

BRIEF DESCRIPTION OF THE DRAWINGS

FIG. 7 is a flow diagram of an example process for multi-content presentation.

FIG. 8 is a flow diagram of another example process for multi-content presentation.

DETAILED DESCRIPTION

Figure 1:
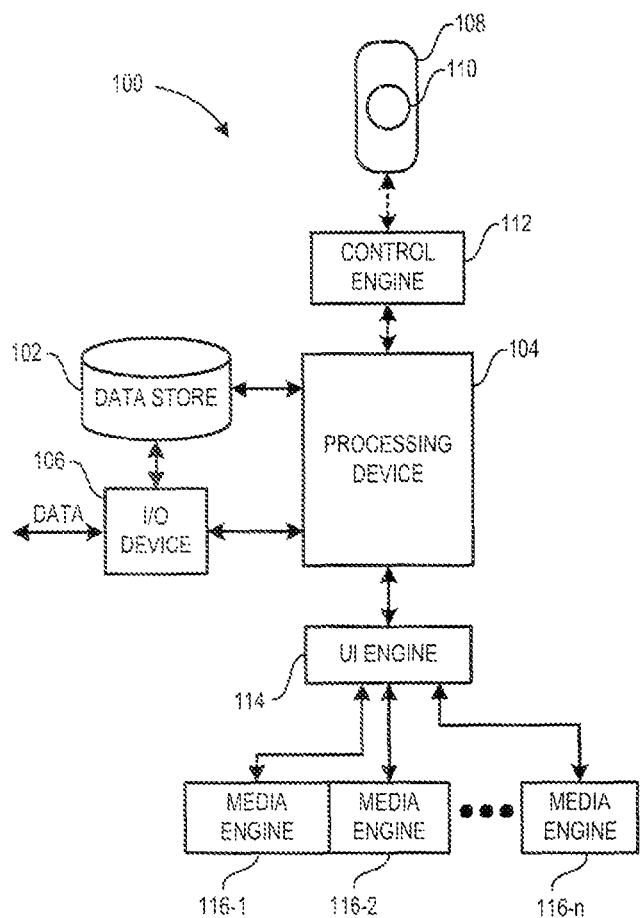
FIG. 1 is a block diagram of an example media processing system.

FIG. 1 is a block diagram of an example media processing system 100. The media processing system 100 can transmit and receive media data and data related to the media data. The media data can be stored in a data store 102, such as a memory device, and be processed by a processing device 104 for output on a display device, such as a television, a computer monitor, a game console, a hand held portable device, and the like, and/or an audio device, such as a multi-channel sound system, a portable media player, a computer system, and the like. The media processing system 100 may be used to process media data, for example, video data and audio data received over one or more networks by an input/output (I/O) device 106. Such media data may include metadata, e.g., song information related to audio data received, or programming information related to a television program received.

The media data and related metadata may be provided by a single provider, or may be provided by separate providers. In one implementation, the media processing system 100 can be configured to receive media data from a first provider over a first network, such as a cable network, and receive metadata related to the video data from a second provider over a second network, such as a vide area network (WAN). Example media data include video data, audio data, content payload data, or other data conveying audio, textual and/or video data.

In another implementation, the media processing system 100 can be configured to receive media data and metadata from a computing device, such as a personal computer. In one example of this implementation, a user manages one or more media access accounts with one or more content providers through the personal computer. For example, a user may manage a personal iTunes® account with iTunes® software, available from Apple computer, Inc. Media data, such as audio and video media data, can be purchased by the user and stored on the user's personal computer and/or one or more data stores. The media data and metadata stored on the personal computer and/or the one or more data stores can be selectively pushed and/or pulled for storage in the data store 102 of the media processing system 100.

In another implementation, the media processing system 100 can be used to process media data stored in several data stores in communication with a network, such as wired and/or wireless local area network (LAN), for example. In one implementation, the media processing system 100 can pull and/or receive pushed media data and metadata from the data stores over the network for presentation to a user. For example, the media processing system 100 may be implemented as part of an audio and video entertainment center having a video display device and an audio output device, and can pull media data and receive pushed media data from one or more data stores for storage and processing. At the entertainment center, a user can, for example, view photographs that are stored on a first computer while listening to music files that are stored on a second computer.

In one implementation, the media processing system 100 includes a remote control device 108. The remote control device 108 can include a rotational input device 110 configured to sense touch actuations and generate remote control signals therefrom. The touch actuations can include rotational actuations, such as when a user touches the rotational input device 110 with a digit and rotates the digit on the surface of the rotational input device 110. The touch actuations can also include click actuations, such as when a user presses on the rotational input device 110 with enough pressure to cause the remote control device 108 to sense a click actuation.

In one implementation, the functionality of the media processing system 100 is distributed across several engines. For example, the media processing system 100 may include a controller engine 112, a user interface (UI) engine 114, and one or more media engines 116-1, 116-2, and 116-n. The engines may be implemented in software as software modules or instructions, or may be implemented in hardware, or in a combination of software and hardware.

The control engine 112 is configured to communicate with the remote control device 108 by a link, such as a wireless infrared signal or radio frequency signal. The remote control device 108 can transmit remote control signals generated, for example, from touch actuations of the rotational input device 110 to the control engine 112 over the link. In response, the control engine 112 is configured to receive the remote control signals and generate control signals in response. The control signals are provided to the processing device 104 for processing.

The control signals generated by the control engine 112 and processed by the processing device 104 can invoke one or more of the UI engine 114 and media engines 116-1-116-n. In one implementation, the UI engine 114 manages a user interface to facilitate data presentation for the media engines 116-1-116-n and functional processing in response to user inputs.

In one implementation, the media engines 116 can include one or more content-specific engines, such as a movies engine, television program engine, music engine, and the like. Each engine 116 can be instantiated to support content-specific functional processing. For example, a movie engine to support movie-related functions can be instantiated by selecting a "Movies" menu item. Example movie-related functions include purchasing movies, viewing movie previews, viewing movies stored in a user library, and the like. Likewise, a music engine to support music-related functions can be instantiated by selecting a "Music" menu item. Example music-related functions include purchasing music, viewing music playlists, playing music stored in a user library, and the like.

The media processing system 100 of FIG. 1 can also implement different functional distribution architectures that have additional functional blocks or fewer functional blocks. For example, the engines 116 can be implemented in a single monolithic engine.

Figure 2:
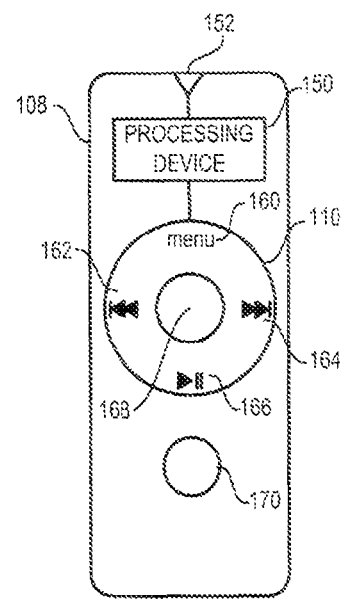
FIG. 2 is a block diagram of an example remote control device for the media processing system.

FIG. 2 is a block diagram of an example remote control device 108 for the media processing system 100. The remote control device 108 includes a rotational input device 110, a processing device 150, and a wireless communication subsystem 152. The rotational input device 110 defines a surface that can sense a touch actuation, such as the presence of a finger on the surface, and can further generate a control signal based on a rotation of the finger on the surface. In one implementation, a touch sensitive array is disposed beneath the surface of the rotational input device 110. The touch sensitive array can be disposed according to polar coordinates, i.e., r and Θ, or can be disposed according to Cartesian coordinates, i.e., x and y.

The rotational input device areas 160, 162, 164, 166 and 168 are receptive to press actuations. In one implementation, the areas include a menu area 160, a reverse/previous area 162, a play/pause area 164, a forward/next area 166, and a select area 168. The areas 160-168, in addition to generating signals related to their descriptive functionalities, can also generate signals for context-dependent functionality. For example, the menu area 160 can generate signals to support the functionality of dismissing an onscreen user interface, and the play/pause area 164 can generate signals to support the function of drilling down into a hierarchal user interface. In one implementation, the areas 160-168 comprise buttons disposed beneath the surface of the rotational input device 110. In another implementation, the areas 160-168 comprise pressure sensitive actuators disposed beneath the surface of the rotational input device 110.

The processing device 150 is configured to receive the signals generated by the rotational input device 110 and generate corresponding remote control signals in response. The remote control signals can be provided to the communication subsystem 152, which can wirelessly transmit the remote control signals to the media processing system 100.

Although shown as comprising a circular surface, in another implementation, the rotational input device 110 can comprise a rectangular surface, a square surface, or some other shaped surface. Other surface geometries that accommodate pressure sensitive areas and that can sense touch actuations may also be used, e.g., an oblong area, an octagonal area, etc.

Other actuation area configurations may also be used. For example, in another implementation, the remote control device 108 can also include a separate actuation button 170. In this implementation, the areas comprise a "+" or increase area 160, a reverse/previous area 162, a "−" or decrease area 164, a forward/next area 166, a play/pause area 168, and a menu area 170.

Figure 3:
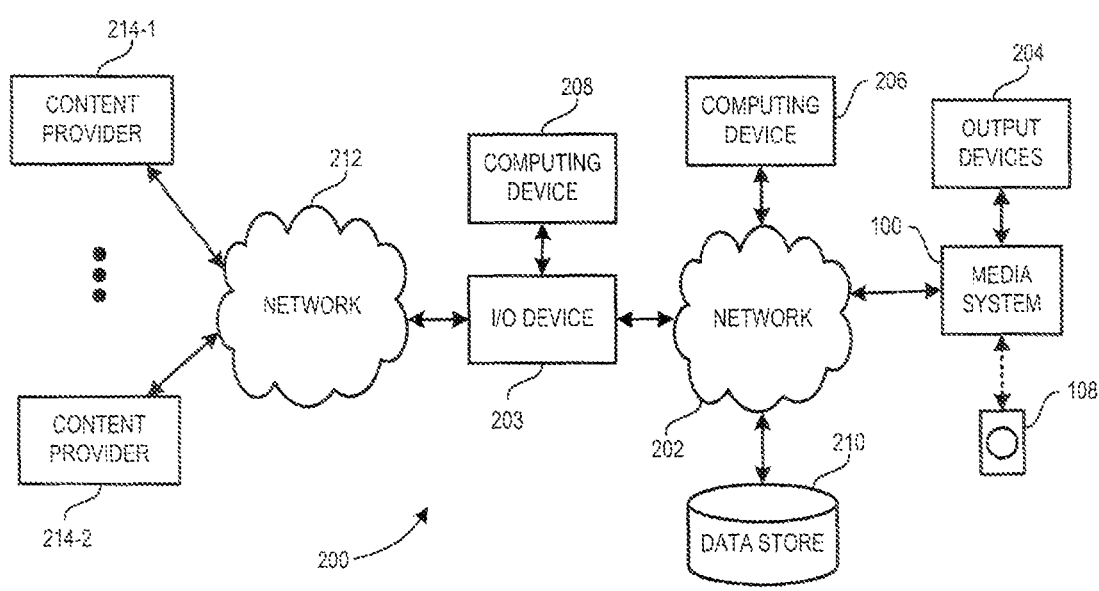
FIG. 3 is an example network environment in which a media processing system in accordance with FIG. 1 may be implemented.

FIG. 3 is an example network environment 200 in which a media processing system 100 in accordance with FIG. 1 may be implemented. The media processing system 100 receives, for example, user input through a remote control device 108 and media data over a network 202, such as a wired or wireless LAN. In one implementation, the network 202 communicates with a wide area network 212, such as the Internet, through an I/O device 203, such as a router, server, cable modem, or other computing and/or communication processing device. The media processing system 100 processes the media data for output to one or more output devices 204. The media processing system 100 can receive the media data from one or more data stores connected to the network 202, such as computing devices 206 and 208, and a data store 210.

The media data can be received through the network 212 by one of the computing devices, such as computing device 208. The network 212 can include one or more wired and wireless networks, such as the Internet. The media data is provided by one or more content providers 214. For example, the content provider 214-1 may provide media data that is processed by the media processing system 100 and output through the output devices 206, and the content provider 214-2 may provide metadata related to the media data for processing by the media processing system 100. Such metadata may include episodic content, artist information, and the like. A content provider 214 can also provide both media data and related metadata.

In one implementation, the media processing system 100 can also communicate with one or more content providers 214 directly. For example, the media processing system 100 can communicate with the content providers the wireless network 202, the I/O device 203, and the network 212. The media processing system 100 can also communicate with the content providers 214 through other network configuration, e.g., through a direct connection to a cable modem, through a router, or through one or more other communication devices. Example communications can include receiving sales information, preview information, or communications related to commercial transactions, such as purchasing audio files and video files.

In another implementation, the media processing system 100 can receive content from any of the computing devices 206 and 208, and other such computing devices or data stores 210 available on the network 202 through sharing. Thus, if any one or more of the computing devices or data stores are unavailable, media data and/or metadata one the remaining computing devices or other such computing devices or data stores can still be accessed.

Figure 4:
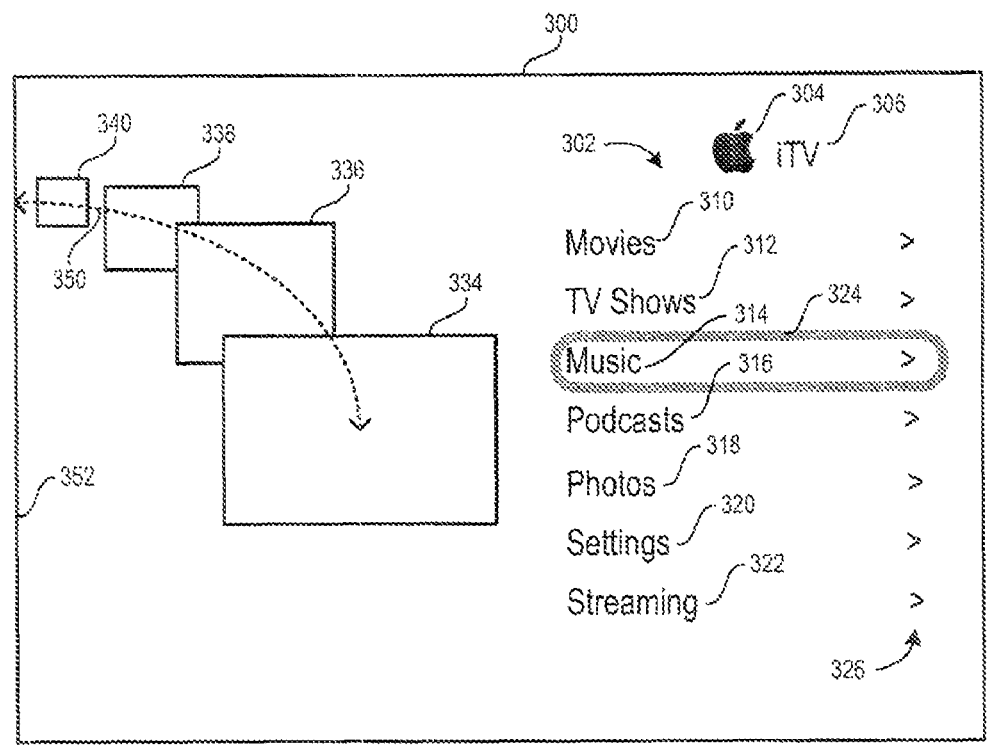
FIG. 4 is a block diagram of an example media menu interface environment.

FIG. 4 is a block diagram of an example media menu interface environment 300. The example media menu interface environment 300 provides a menu interface from which one or more of a plurality of content-specific menus and corresponding functions may be selected.

In one implementation, the media menu interface environment 300 includes a media menu 302 identified in part by an icon 304 in a title location and a title 306, e.g., "iTv." The media menu 302 includes media menu items 310, 312, 314, 316, 318, 320 and 322, respectively entitled "Movies," "TV Shows," "Music," "Podcasts," "Photos," "Settings," and "Streaming." The media menu 302 can also include a highlight indicator 324 that highlights a media menu item. In one implementation, the highlight indicator 324 is a graphical indicator that provides the effect of a diffused backlighting, e.g., a glow highlight that provides the appearance of a backlit surface beneath the highlighted menu item.

A highlight selection of a menu item by the highlight indicator 324 indicates that the menu item is eligible for a further selection action, e.g., eligible to be selected by actuating the select area 168 on the rotational input device 110. The highlight indicator 324 can be moved vertically, for example, by actuating menu area 160 and the play/pause area 164 on the rotational input device 110.

Upon the further selection, a process associated with the highlighted menu item is performed. In one implementation, selection of the media menu item 310 when highlighted generates a movie content menu environment for processing media data related to movies, such as movie previews and full-length movies. Selection of the media menu item 312 when highlighted generates a TV Shows content menu environment for processing media data related to television programs, such as program episodes. Selection of the media menu item 314 when highlighted generates a Music content menu environment for processing media data related to music, such as audio files and music video files. Selection of the media menu item 316 when highlighted generates a Podcasts content menu environment for processing media data related to podcasts. Selection of the media menu item 318 when highlighted generates a Photos content menu environment for processing media data related to photos, such as photographs and videos. Selection of the media menu item 320 when highlighted generates a settings menu environment for changing settings of the media system, such as setting restrictions and shared files. Selection of the media menu item 322 when highlighted generates a Streaming menu environment for identifying and selecting media data stored on data stores or computer devices accessible through a network, such as media data stored on computing devices 206 and 208 and data store 210 and accessible over the network 202 of FIG. 2.

The media menu 302 can also include a child indicator 326 associated with a media menu item. The child indicator 326 indicates that one or more sub-menus or sub-items, e.g., folders, will become available or will be accessed upon selection of the corresponding media menu item.

The media menu interface environment 300 also includes media menu item abstractions that correspond to one or more of the media menu items. For example, the media menu item abstractions 334, 336, 338 and 340 correspond to media menu items 314, 316, 318 and 320, respectively. In one implementation, the media menu item abstractions are graphical representations of the content of corresponding media menu items. For example, the media menu item abstraction 334, which corresponds to the Music media menu item 314, can be a music icon. Likewise, the media menu item abstraction 336, which corresponds to the Podcasts media menu item 316, can be a podcasts icon; the media menu item abstraction 338, which corresponds to the Photos media menu item 318, can be a photographic icon, etc.

In one implementation, the media menu item abstractions 334-340 are arranged such that at least one of the media menu item abstractions, e.g., icon 334, is in a foreground position, and the remaining the media menu item abstractions, e.g., icons 336-340, are in one or more background positions. The foreground and background positions define a multidimensional path 350, and the media menu item abstraction 340 is in a background position that defines a terminus of the multidimensional path. In one implementation, the terminus is at the edge 352 of the media menu interface environment 300.

In one implementation, changing the position of the highlight indicator 324 causes the highlight indicator to transition from a highlighted media menu item to a media menu item to be highlighted, e.g., an adjacent media menu item. The transition of the highlight indicator 324 likewise causes the media menu item abstractions to transition between the foreground and background positions along the multidimensional path 350 until the media menu item abstraction corresponding to the newly-highlighted media menu item is in the foreground position.

Figure 5:
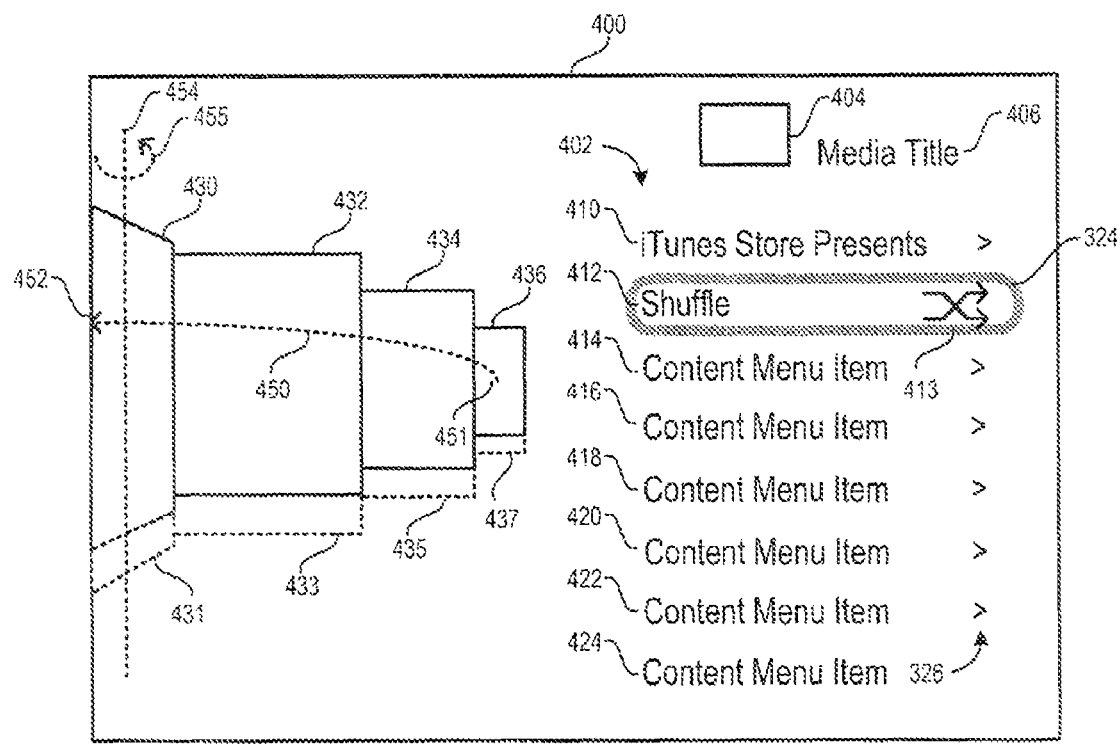
FIG. 5 is a block diagram of an example content menu interface environment.

FIG. 5 is a block diagram of an example content menu interface environment 400. The example content menu interface environment 400 is generated upon the selection of a menu item highlighted by the highlight indicator 324, and can, for example, instantiate a corresponding media engine 116. Such a selection can be initiated by actuating the select area 168 on the rotational input device 110, for example.

The example content menu interface environment 400 of FIG. 5 can correspond to movie content if the content menu item 310 was highlighted and selected; or can correspond to television content if the content menu item 312 was highlighted and selected; or can correspond to music content if the content menu item 314 was highlighted and selected; or can correspond to podcast content if the content menu item 316 was highlighted and selected; or can correspond to photographic content if the content menu item 318 was highlighted and selected; or can correspond to another type of content if another type of content menu item was selected. The content menu interface environment 400 can be generated as the end result of the transition from the media menu interface environment 300 to the content menu interface environment 400.

In one implementation, the content menu interface environment 400 includes a content menu 402 identified in part by a scaled media menu item abstraction 404 in a title location, such as a scaled version of the media menu item abstraction 334, and a title 406, e.g., "Movies," or "TV Shows," or "Music," etc., depending on the content menu item selected in the content menu interface environment 300. The content menu 402 includes content menu items 410, 412, 414, 416, 418, 420 and 422. The content menu 402 can also include the highlight indicator 324 that highlights a content menu item. A highlight selection of a menu item by the highlight indicator 324 indicates that the menu item is eligible for a further selection action, e.g., eligible to be selected by actuating the select area 168 on the rotational input device 110.

In one implementation, the first content menu item 410 is a sales content menu associated with content offered for sale. For example, the content menu item 410 is entitled "iTunes Store Presents," and includes a child indicator 326. Selecting the iTunes Store Presents content menu item 410 can, for example, transition to another content menu that lists one or more content items available for purchase by, for example, download. In one implementation, the content items listed for sale correspond to the content type of the content menu 402. For example, if the content menu interface environment 400 of FIG. 5 relates to Movies, then the content items listed in response to selecting the highlighted menu item 410 can be movies; likewise, if the content menu interface environment 400 of FIG. 5 relates to Music, then the content items listed in response to selecting the highlighted menu item 410 can be songs.

In one implementation, selection of the content menu item 412, entitled "Shuffles," initiates a shuffle play of content titles, as indicated by the shuffle indicator 413. In one implementation, the shuffle play content menu item 412 initiates a shuffle play of only the content menu items related to the current content menu interface 400, e.g., only movies, or only songs, or only photos, etc. In another implementation, the selection of the shuffle play content menu item 412 initiates a shuffle play of content items for more than one content type. For example, initiating a shuffle play in a "Music" content interface environment 400 can also cause video content, such as photos and/or videos, to be presented during the shuffle play of musical titles.

The additional content menu items 414-424 can facilitate access to additional content processing schemes, e.g., playlists, or access to one or more library items, e.g., content stored in one or more data stores. For example, in a "Music" content interface environment, the content menu items 414-424 can include content arranged in hierarchal categories such as music videos, artists, albums, and the like. Likewise, in a "Movies" content interface environment, the content menu items 414-424 can include content menu items for access to theatrical trailers, and library content menu items corresponding to movie titles stored in one or more data stores. Similarly, in a "Photos" content interface environment, the content menu items 414-424 can include content menu items for access playlists, recent photo sessions, photos categorized by date or by event, and the like. Content menu items that include a child indicator 326, e.g., content menu items 414-424, can include one or more subfolder categories The content menu interface environment 400 also includes content abstractions that correspond to one or more content menu items. For example, the content abstractions 430, 432, 434 and 436 correspond to the content menu item 410. In one implementation, the content abstractions are graphical representations of the content corresponding to the highlighted content menu item. For example, in a "Movies" content interface environment, the content abstractions that correspond to the iTunes Presents content menu item 410 can comprise digital representations of movie posters for movies that are presently offered for sale at iTunes. Alternatively, digital representations of movie stills can be used, or video clips of the movies can be used, or some other content abstraction. Likewise, in a "Music" content interface environment, the content abstractions that correspond to the shuffle play content menu item 412 can comprise digital representations of album art for songs that are eligible to be selected for shuffle play. The content abstractions 430, 432, 434 and 436 can also include reflections 431, 433, 435 and 437.

In one implementation, a set of content abstractions can be associated with a single content menu item, or can be associated with a plurality of content menu items. For example, if the content menu interface environment 400 of FIG. 5 relates to music, a first set of content abstractions can be associated with the content menu item 410, and a second set of content abstractions can be associated with the remaining content menu items 412, 414, 416, 418, 420, 422 and 424.

The first set of content abstractions can, for example, comprise digital representations of album art for songs that are offered for sale through the sales content menu item 410. The remaining content menu items 412-424 can, for example, correspond to content stored in a user library, and thus the second set of content abstractions, for example, can comprise digital representations of album art corresponding to songs accessible through the library content menu items 614-624.

In one implementation, the content abstractions, e.g., content abstractions 430, 432, 434 and 436, transition along a multidimensional path 450 having an ingress terminus 451 and an egress terminus 453 in a manner that provides the effect of transitioning in depth. For example, in FIG. 5, the content abstractions 430, 432, 434 and 436 depth transition along a three-dimensional coordinate system from the ingress terminus 451 to the egress terminus 453, e.g., along an axis substantially perpendicular to the screen, or according to an x-, y-, and z-translation in a three-dimensional environment, and the like. In one implementation, the ingress terminus 451 is within the content menu interface environment 400, e.g., beneath the content abstraction 434, and the egress terminus 453 is at an edge 452 of the content menu interface environment 400. The content abstractions emerge into the multidimensional path 450 at the egress terminus 451 and are eliminated from the multidimensional path 451 at the egress terminus 453. Upon elimination at the egress terminus 453, the content abstractions rotate about an axis 454 in the direction indicated by the rotational arrow 455. In one implementation, the rate of rotation increases nonlinearly to simulate an effect that the content abstraction is "flipped" out of the content menu interface environment 400.

Figure 6:
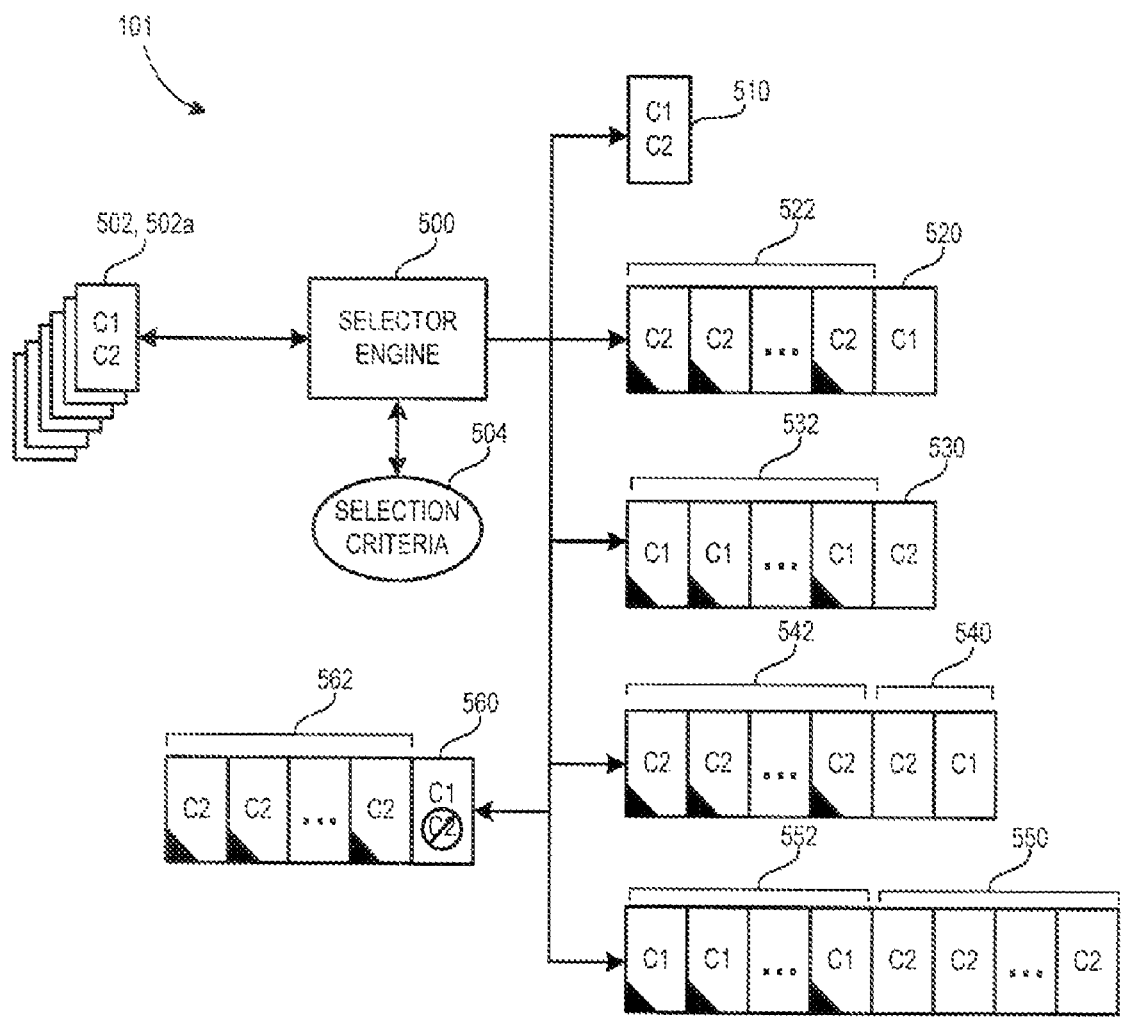
FIG. 6 is a block diagram of an example multi-content presentation system that may be implemented in the media processing system of FIG. 1.

FIG. 6 is a block diagram of an example multi-content presentation system 101 that can be implemented in the media processing system 100 of FIG. 1, such as in one of the media engines 116. In one implementation, the multi-content presentation system 101 includes a selector engine 500 that can be instantiated upon the initiation of a playback or presentation function from one or more of the content menu interface environments 400. The selector engine 500 can select one or more media items 502 for presentation. Example media items 502 include media files, such as video files, including photographs and video clips; audio files, such as audio books and music; or stream objects, such as audio and/or video streams received by the media processing system 100 through a network, such as the network 202 of FIG. 2.

In one implementation, the selector engine 500 selects the media files 502 according to a set of selection criteria 504. The selection criteria 504 can, for example, include one or more playlists, or can include a random process for random selection from the media files, e.g., shuffle criteria.

Each of the media items 502 includes at least a first media content item, e.g., C1, which is at least one of two media content types, e.g., C1 and C2. Example media content types include, for example, audio content, e.g., C1, and video content, e.g., C2. Thus, a media item 502 may include audio content only, e.g., C1 or may include video content only, e.g., C2, or may include both audio and video content e.g., C1 and C2. The audio content can include, for example, speech content and music content, and the video content can include motion video content, e.g., movies, and still video content, e.g., photographs.

The media items 502 can thus include some or all of the media content accessible through all of the various content menu interface environments 400. Accordingly, in one implementation, the selector engine 500 can select any of the media items 502 capable of being processed by the media processing system 100, e.g., movies, photos, songs, etc., for presentation according to selection criteria 504. In a variation of this implementation, the selector engine 500 can receive a user input to define the selectable media content, e.g., "All" to select from all media items; or "Music Only" to select only media items having musical content; "Photos" to select only media items having photographic content, etc. The selector engine can also, for example, receive a user input to define combinations of selectable content for concurrent presentation, e.g., "Music and Photos" can be a selection criterion to select music titles according to a playlist and shuffle photos during playback of the musical titles.

In another implementation, the selector engine 500 is configured to select a media item 502 for presentation, and determine if the selected media item 502 comprises a second media content type that is the other of the two media content types C1 and C2. If the selected media item 502 does not comprise the second media content type, then the selector engine 500 can select one or more unassociated other additional media items 502a that comprise the other of the two media content types. Thereafter, the selected media item 502 is presented, e.g., played back if an audio content C1 or displayed if a video content C2, and the selected one or more other media items 502a are presented during the presentation of the selected media item 502. The selector engine 500 thus ensures that a multi-content presentation is provided to the user.

For example, a user may select the Shuffle content menu item 412 from a content menu interface environment 400. The selector engine 500 may then first select a media item 510 from the media items 502 according to the shuffle play selection criteria 504. The media item 510 includes both audio content C1 and video content C2. Thus, the selector engine 500 does not select an additional media item 502a for presentation, as the media item 510 will provide both audio and video content during presentation.

Thereafter, the selector engine 500 may select a media item 520 from the media items 502 according to the shuffle play selection criteria 504. The media item 520 includes only audio content C1. Accordingly, the selector engine 500 selects additional media items 522, as indicated by the darkened corners, having audio content C1 for presentation during the presentation of the selected media item 520. Thus, during the presentation of the media item 520, which provides audio content C1, such as a song, additional media items 532 will be presented to provide video content C2, such as family photos.

Thereafter, the selector engine 500 may select a media item 530 from the media items 502 according to the shuffle play selection criteria 504. The media item 530 includes only video content C2. Accordingly, the selector engine 500 selects additional media items 532, as indicated by the darkened corners, having audio content C1 for presentation during the presentation of the selected media item 530. Thus, during the presentation of the media item 530, which provides video content C2, such as a photograph or a video, additional media items 532 will be presented to provide audio content C1, such as songs.

A media item 502 of a first content type, e.g., audio content C1, such as a song, may have an associated media item 502 of a second content type, e.g., video content C2, such as a digital representation of album art. Such media items are typically presented simultaneously during playback of the audio content. In one implementation, unassociated media items 502a may also be selected for presentation during the presentation of the selected media item 502. For example, the selector engine 500 can select set of media items 540, e.g., a song and associated album cover art, and select additional media items 542 having video content C2 for presentation during the presentation of the selected media items 540. Thus, for example, while a song is playing, the album art may be periodically displayed on a display to identify the artist, and family photos may also be displayed for viewing by the user. Alternatively, if the selected media items 540 collectively comprise a music video, the video content C2 of the selected media items 540 can be displayed in a sub-portion of the display, and the additional video items 542 can be presented elsewhere in the display.

In another implementation, the selector engine 500 can select a first set of one or more media items 502 of similar content type for presentation, and select a second set of one or more additional media items 502a of the other similar content type for presentation during the presentation of the first set of media items 502. For example, the selector engine 500 may select a first set of media items 550 having video content C2, and select a second set of media items 552 having audio content C1. The second set of media items 552 can then be presented during the presentation of the first set of media items 550.

In another implementation, the selector engine 500 can select a first media item 502 having both audio content C1 and video content C2 for presentation, such as a music video, and suppress one of the content types, e.g., the video content C2. The selector engine 500 can then select a second set of one or more additional media items 502a of the suppressed content type for presentation during the presentation of the first set of media item 502. For example, the selector engine 500 may select a first media item 560, such as a music video, and suppress the video content C2, and select a second set of media items 562 having video content C2. The video content C2 of the second set of media items 562 can then be presented during the presentation of the audio content C1 of the selected media item 560.

In one implementation, the selected additional media items 502a may be associated with a selected media item 502. The association can be made by the user or automatically by the system or by other means. Thereafter, if the selected media item 502 is again selected for playback, the same additional selected media items may again be presented. For example, after listening to the song content of the media item 520 and viewing the video content of the media items 522, a user may associate the media items 522 with the media item 520. Thereafter, if the media item is again selected, e.g., by the selector engine 500 or manually by the user, the media items 522 are again presented during the presentation of the media item 520.

In another implementation, the one or more additional media items 502*a* can be presented based on an aspect of the content type of the selected media item 502 being presented. For example, if a content type C1 of a first media item is a song, and the content type C2 of the one or more additional media items 502*a* are images, then the images can be presented by cycling one or more of the images at a frequency based on a song tempo. Thus, fast-pace songs can cause the images to by cycled rapidly, and slow-paced songs can cause the images to be cycled slowly. Other presentation effects can also be generated; for example, the one or more addition images can be presented by imploding disparate fragments into the image to introduce the image, and then exploding the image into disparate fragments to eliminate the image. The frequency and violence of the implosive introduction and explosive elimination can vary based on a characteristic of the song being presented, e.g., tempo, beat, etc.

FIG. 7 is a flow diagram of an example process 600 for multi-content presentation. In one example implementation, the processing device 104 and/or the selector engine 500, implemented, for example, as a media engine 116, and one or more other media engines 116, can perform operations to implement the process 600.

Stage 602 selects media items for presentation. The media items comprise at least a first media content that is one of two media content types. For example, the processing device 104 and/or the selector engine 500, implemented, for example, as a media engine 116, and one or more other media engines 116, can select one or more of the media items 502.

Stage 604 determines if the selected media item comprises the second media content. For example, the processing device 104 and/or the selector engine 500, implemented, for example, as a media engine 116, and one or more other media engines 116, can determine if a selected media item having a first content C1 also comprises a second content C2.

If the selected media item comprises the second media content, then stage 606 presents the selected media item. For example, the processing device 104 and/or the selector engine 500, implemented, for example, as a media engine 116, and one or more other media engines 116, can present audio content and video content of a selected media item.

If the selected media item does not comprise the second media content, then stage 608 selects one or more other media items that comprise the other of the two media content types. For example, the processing device 104 and/or the selector engine 500, implemented, for example, as a media engine 116, and one or more other media engines 116 can select media items having second media content C2 for a selected media item having the first media content C1.

Stage 610 then presents the selected media item and the one or more other selected media items during the presentation of the selected media item. For example, the processing device 104 and/or the selector engine 500, implemented, for example, as a media engine 116, and one or more other media engines 116 can present a selected media item, e.g. media item having first content C1, and the selected one or more other media items having second content C2.

FIG. 8 is a flow diagram of another example process 630 for multi-content presentation. In one example implementation, the processing device 104 and/or the selector engine 500, implemented, for example, as a media engine 116, and one or more other media engines 116, can perform operations to implement the process 630.

Stage 632 associates the selected one or more other media items with the selected media item. For example, the processing device 104 and/or the selector engine 500, implemented, for example, as a media engine 116, can associate the selected one or more other media items with a selected media item.

Stage 634 stores the association. For example, the processing device 104 and/or the selector engine 500, implemented, for example, as a media engine 116, can store the association in a data store, such as the data store 102 of the media processing device 100.

Stage 636 presents the selected one or more other media items according to the association when presenting the selected media item during subsequent presentations. For example, the processing device 104 and/or the selector engine 500, implemented, for example, as a media engine 116, and one or more other media engines 116, can present the associated media items with the selected media item when the selected media item is again presented. The selected media item can be selected again by the selector engine 500, or manually selected by the user.

Figure 9:
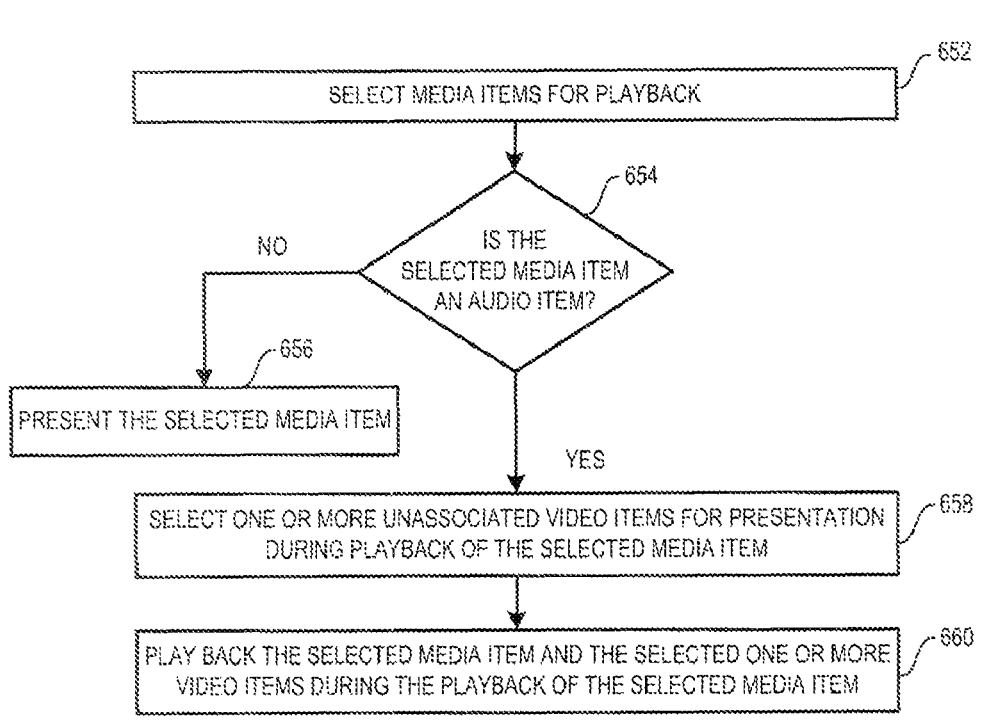
FIG. 9 is a flow diagram of another example process for multi-content presentation.

FIG. 9 is a flow diagram of an example process 650 for multi-content presentation. In one example implementation, the processing device 104 and/or the selector engine 500, implemented, for example, as a media engine 116, and one or more other media engines 116, can perform operations to implement the process 650.

Stage 652 selects media items for playback. For example, the processing device 104 and/or the selector engine 500, implemented, for example, as a media engine 116, and one or more other media engines 116 can select media items 502 for playback.

Stage 652 determines if the selected media item is an audio item. For example, the processing device 104 and/or the selector engine 500, implemented, for example, as a media engine 116, and one or more other media engines 116 can determine if the selected media item is an audio file, an audio stream, and the like.

If the selected media item is not an audio item, then stage 656 presents the selected media file. For example, the processing device 104 and/or the selector engine 500, implemented, for example, as a media engine 116, and one or more other media engines 116 can play back a video item, such as a movie.

If the selected media item is an audio item, then stage 658 selects one or more unassociated video items for presentation during playback of the selected media item. For example, the processing device 104 and/or the selector engine 500, implemented, for example, as a media engine 116, and one or more other media engines 116 can select photograph files if the selected media item is a song file. The song file can have one or more associated video files, such as an image file storing an image of album cover art.

Stage 660 plays back the selected media file and the selected one or more video items during the playback of the selected media file. If the selected media item is not an audio item, then stage 656 presents the selected media file. For example, the processing device 104 and/or the selector engine 500, implemented, for example, as a media engine 116, and one or more other media engines 116 can display the photograph files during the playback of the selected song file. Additionally, associated video files, if any, can also be presented.

Figure 10:
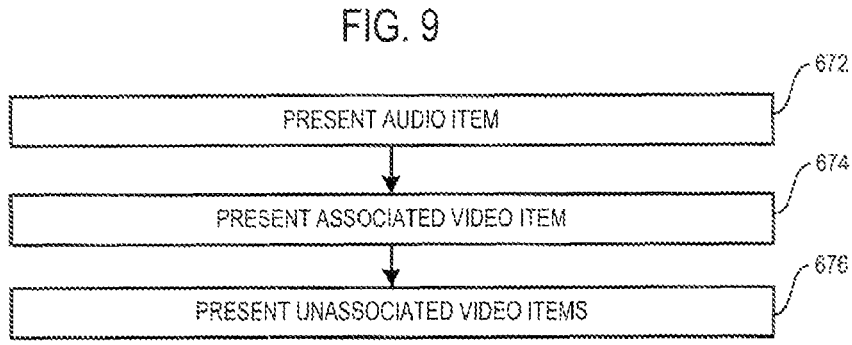
FIG. 10 is a flow diagram of another example process for multi-content presentation.

FIG. 10 is a flow diagram of an example process 670 for multi-content presentation. In one example implementation, the processing device 104 and/or the selector engine 500, implemented, for example, as a media engine 116, and one or more other media engines 116 can perform operations to implement the process 670.

Stage 672 presents the audio item. For example, the processing device 104 and/or the selector engine 500, implemented, for example, as a media engine 116, and one or more other media engines 116, can play back a song file.

Stage 674 presents associated video items. For example, the processing device 104 and/or the selector engine 500, implemented, for example, as a media engine 116, and one or more other media engines 116, can display an image file storing an image of album cover art associated with the song file.

Stage 676 presents unassociated video items. For example, the processing device 104 and/or the selector engine 500, implemented, for example, as a media engine 116, and one or more other media engines 116, can display photograph files during the playback of the selected song file and can display an image file storing an image of album cover art associated with the song file.

Figure 11:
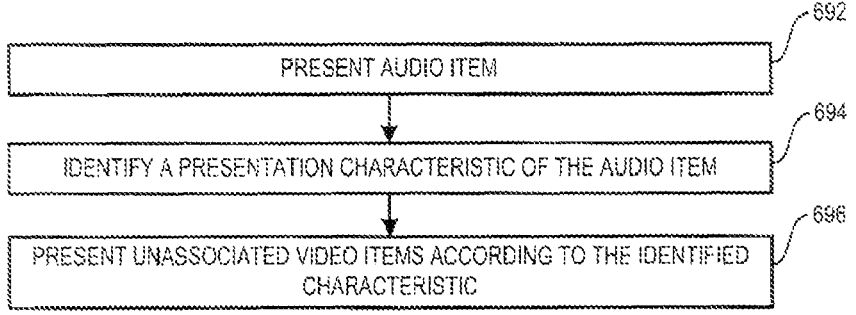
FIG. 11 is a flow diagram of another example process for multi-content presentation.

FIG. 11 is a flow diagram of an example process 690 for multi-content presentation. In one example implementation, the processing device 104 and/or the selector engine 500, implemented, for example, as a media engine 116, and one or more other media engines 116 can perform operations to implement the process 690.

Stage 692 presents the audio item. For example, the processing device 104 and/or the selector engine 500, implemented, for example, as a media engine 116, and one or more other media engines 116, can play back a song file.

Stage 694 presents identifies a presentation characteristic of the audio item. For example, the processing device 104 and/or the selector engine 500, implemented, for example, as a media engine 116, and one or more other media engines 116, can identify a presentation characteristic of the song file, e.g., a beat, a tempo, etc.

Stage 696 presents the unassociated video items according to the identified characteristic. For example, the processing device 104 and/or the selector engine 500, implemented, for example, as a media engine 116, and one or more other media engines 116, can display photograph files during the playback of the selected song file at fast rate for songs with a fast tempo, and at a slow rate for songs with a slow tempo. Additionally, the presentation of the unassociated video items can be modified in other ways according to the tempo, e.g., a color balance can change in accordance with a beat; the image may disassociate and reconstitute in accordance with the tempo, etc.

The stages recited in the example processes of FIGS. 7-11 need not be performed in the example orders set forth.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method, comprising:

selecting by a media processing system media files for playback; and for each media file selected:

determining by the media processing system content types the media file comprises;

in response to determining that the media file comprises video content and audio content, presenting on a media device both the video content and the audio content of the media file during a playback of the media file;

in response to determining that the media file comprises only video content, selecting by the media processing system another media file comprising audio content that is unassociated with the video content of the media file and presenting on the media device the audio content of the another media file while presenting the video content of the media file; and in response to determining that the media file comprises only audio content, selecting by the media processing system another media file comprising video content that is unassociated with the audio content of the media file and presenting on the media device the video content of the another media file while presenting the audio content of the media file.

2. The method of claim 1, wherein:

the unassociated video content comprises photographic data.

3. The method of claim 1, wherein:

the unassociated video content comprises video data.

4. The method of claim 1, wherein:

the media file comprising audio and video content is a music file; and the video content of the media file comprising audio and video content comprises a digital representation of album cover art associated with the music file.

5. The method of claim 4, wherein:

selecting media files for playback comprises selecting media files according to a playlist.

6. The method of claim 4, wherein:

selecting media files for playback comprises randomly selecting media files.

7. The method of claim 1, comprising:

storing the audio content of the media file comprising only audio content and the unassociated video content of the another media file as an audio/video content association; and presenting the unassociated video content of the another media file during subsequent selections and playback of the audio content of the media file according to the stored audio/video content association.

8. The method of claim 1, wherein:

selecting another media file comprising video content unassociated with the audio content of the media file comprises randomly selecting the unassociated video content.

9. The method of claim 1, comprising:

presenting the unassociated video content of the another media file based on an audio tempo of the audio content of the media file comprising only audio content.

10. A method, comprising:

storing media files in a data store;

selecting by a media processing system media files files for playback;

for each selected media file:
- determining by the media processing system content types the media file comprises;
- in response to determining that the media file comprises video content and audio content, presenting on a media device both the video content and the audio content of the media file during a playback of the media file;
- in response to determining that the media file comprises only video content, selecting by the media processing system another media file comprising only audio content that is unassociated with the video content of the media file and presenting on the media device the audio content of the another media file while presenting the video content of the media file; and
- in response to determining that the media file comprises only audio content, selecting by the media processing system another media file comprising only video content that is unassociated with the audio content of the media file and presenting on the media device the video content of the another media file while presenting the audio content of the media file.

11. The method of claim 10, wherein:
the unassociated video content of the another media file comprises photographic data.

12. The method of claim 10, wherein:
the unassociated video content of the another media file comprises video data.

13. The method of claim 10, wherein:
the audio content of the media file comprising video content and audio content is a music file; and
the video content of the media file comprising video content and audio content comprises a digital representation of album cover art associated with the audio file.

14. The method of claim 10, wherein:
selecting the media files for playback comprises selecting media files according to a playlist.

15. The method of claim 10, wherein:
selecting the media files for playback comprises randomly selecting media files.

16. A method, comprising:
selecting by a media processing system a media item for presentation, the media item comprising one or more content types;
determining by the media processing system the content types of the media item;
in response to determining that the media item comprises video content and audio content, presenting on a media device both the video content and the audio content of the media item during a playback of the media item;
in response to determining that the media item comprises only video content, selecting by the media processing system another media item comprising audio content that is unassociated with the video content of the media item and presenting on the media device the audio content of the another media item while presenting the video content of the media item; and
in response to determining that the media item comprises only audio content, selecting by the media processing system another media item comprising video content that is unassociated with the audio content of the media item and presenting on the media device the video content of the another media item while presenting the audio content of the media item.

17. The method of claim 16, wherein:
the unassociated video content comprises photographic data.

18. The method of claim 17, wherein:
the unassociated audio content comprises musical data.

19. The method of claim 16, wherein selecting a media item for presentation comprises:
selecting the media item according to a shuffle criteria.

20. The method of claim 16, comprising:
storing the audio content of the media item comprising only audio content and the unassociated video content of the another media item as an audio/visual content association; and
presenting the unassociated video content of the another media item when presenting the audio content of the media item during subsequent presentations of the media item according to the stored audio/video content association.

21. A method, comprising:
selecting by a media processing system a media file for playback, the media file having content of only one of two content types, the two content types being an audio content type and a video content type;
determining by the media processing system the content type of the content of the media file;
in response to the determination of the content type of the content of the media file, selecting by the media processing system another media file having content of only the other of the two content types; and
presenting on a media device the content of the another media file while presenting the content of the media file.

22. The method of claim 21, wherein the content of the another media file is unassociated with the content of the media file.

23. The method of claim 22, wherein the content of the media file is of a video content type and the content of the another media is of an audio content type.

24. The method of claim 22, wherein the content of the media file is of an audio content type and the content of the another media is of a video content type.

* * * * *

UNITED STATES PATENT AND TRADEMARK OFFICE
CERTIFICATE OF CORRECTION

| | | |
|---|---|---|
| PATENT NO. | : 7,831,727 B2 | Page 1 of 1 |
| APPLICATION NO. | : 11/530822 | |
| DATED | : November 9, 2010 | |
| INVENTOR(S) | : Aoki et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

Signed and Sealed this
Sixteenth Day of August, 2011

David J. Kappos
*Director of the United States Patent and Trademark Office*

UNITED STATES PATENT AND TRADEMARK OFFICE
CERTIFICATE OF CORRECTION

PATENT NO. : 7,831,727 B2  
APPLICATION NO. : 11/530822  
DATED : November 9, 2010  
INVENTOR(S) : Rainer Brodersen et al.

Page 1 of 1

It is certified that error appears in the above-identified patent and that said Letters Patent is hereby corrected as shown below:

On the Title Page, Assignee, please delete "Apple Computer, Inc." and insert
--Apple Inc.-- therefor.

Signed and Sealed this
Sixth Day of September, 2011

David J. Kappos
*Director of the United States Patent and Trademark Office*

UNITED STATES PATENT AND TRADEMARK OFFICE
CERTIFICATE OF CORRECTION

Page 1 of 1

PATENT NO. : 7,831,727 B2
APPLICATION NO. : 11/530822
DATED : November 9, 2010
INVENTOR(S) : Brodersen et al.

It is certified that error appears in the above-identified patent and that said Letters Patent is hereby corrected as shown below:

On the title page,

INVENTOR(S): Aoki et al.

Delete the phrase "Aoki et al." and insert -- Brodersen et al. --.

In column 7, line 37, delete ""Shuffles,"" and insert -- "Shuffle," --, therefor.

In column 7, line 65, delete "categories" and insert -- categories. --, therefor.

In column 15, line 1, in claim 10, after "media files" delete "files".

Signed and Sealed this
Twenty-ninth Day of November, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,831,727 B2 | Page 1 of 1 |
| APPLICATION NO. | : 11/530822 | |
| DATED | : November 9, 2010 | |
| INVENTOR(S) | : Brodersen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 728 days.

In column 7, line 37, delete ""Shuffles,"" and insert -- "Shuffle," --, therefor.

In column 7, line 65, delete "categories" and insert -- categories. --, therefor.

In column 15, line 1, in claim 10, after "media files" delete "files".

This certificate supersedes the Certificate of Correction issued August 16, 2011 and November 29, 2011.

Signed and Sealed this
Third Day of January, 2012

David J. Kappos
*Director of the United States Patent and Trademark Office*